(12) United States Patent
Shindo

(10) Patent No.: US 11,097,163 B2
(45) Date of Patent: Aug. 24, 2021

(54) GOLF BALL AND METHOD OF MANUFACTURE

(71) Applicant: Bridgestone Sports Co., Ltd., Tokyo (JP)

(72) Inventor: Jun Shindo, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 16/725,002

(22) Filed: Dec. 23, 2019

(65) Prior Publication Data

US 2020/0206575 A1 Jul. 2, 2020

(30) Foreign Application Priority Data

Dec. 27, 2018 (JP) .............................. JP2018-245161

(51) Int. Cl.
*A63B 37/06* (2006.01)
*A63B 37/00* (2006.01)

(52) U.S. Cl.
CPC ........ *A63B 37/0054* (2013.01); *A63B 37/006* (2013.01); *A63B 37/0076* (2013.01)

(58) Field of Classification Search
CPC .......................... A63B 37/0039; A63B 37/0038
USPC ......................................................... 473/373
See application file for complete search history.

(56) References Cited

U.S. PATENT DOCUMENTS

| | | | |
|---|---|---|---|
| 4,848,770 A | 7/1989 | Shama | |
| 5,002,281 A | 3/1991 | Naahara et al. | |
| 5,482,285 A | 1/1996 | Yabuki et al. | |
| 6,172,161 B1 | 1/2001 | Bissonnette et al. | |
| 6,180,040 B1 | 1/2001 | Ladd et al. | |
| 6,207,095 B1 | 3/2001 | Gosetti | |
| 6,494,791 B1 | 12/2002 | Bissonnete et al. | |
| 6,679,789 B2 | 1/2004 | Bissonnette et al. | |
| 2011/0009212 A1* | 1/2011 | Goguen | A63B 37/005 473/372 |
| 2017/0182369 A1* | 6/2017 | Binette | A63B 37/0064 |
| 2018/0086011 A1* | 3/2018 | Blink | B29C 55/00 |

FOREIGN PATENT DOCUMENTS

| | | | | |
|---|---|---|---|---|
| JP | 63-105774 A | 5/1988 | | |
| JP | 02-228978 A | 9/1990 | | |
| JP | 06-218077 A | 8/1994 | | |
| WO | WO-2018117202 A1 * | 6/2018 | ............. | C08L 21/00 |

OTHER PUBLICATIONS

Translation of WO 2018117202 (Year: 2018).*

* cited by examiner

*Primary Examiner* — Raeann Gorden
(74) *Attorney, Agent, or Firm* — Sughrue Mion, PLLC

(57) ABSTRACT

A golf ball having a center core, one or more envelope layer encasing the center core and one or more cover layer is provided wherein at least one envelope layer is formed of a rubber composition that includes (a) a diene rubber, (b) a tetrazine compound of a specific formula or a metal salt thereof, (c) an α,β-unsaturated carboxylic acid metal salt and (d) an organic peroxide. A method for manufacturing the golf ball is also provided. The golf ball has a high rebound and durability. The manufacturing method, by eliminating the need to furnish equipment for a bonding step, lowers production costs and is industrially advantageous.

11 Claims, 1 Drawing Sheet

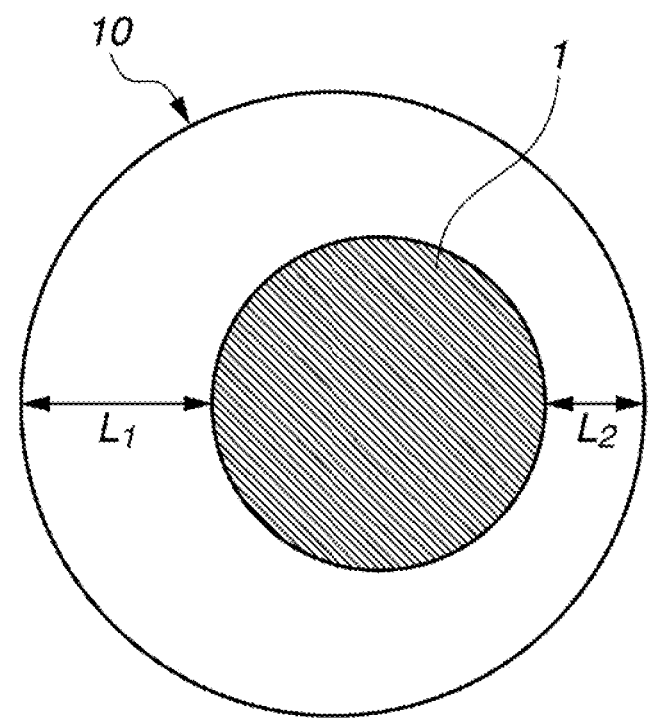

GOLF BALL AND METHOD OF MANUFACTURE

CROSS-REFERENCE TO RELATED APPLICATION

This non-provisional application claims priority under 35 U.S.C. § 119(a) on Patent Application No. 2018-245161 filed in Japan on Dec. 27, 2018, the entire contents of which are hereby incorporated by reference.

TECHNICAL FIELD

The present invention relates to a golf ball having a core member formed of a center core and one or more envelope layer encasing the center core. The invention relates also to a method for manufacturing such a golf ball.

BACKGROUND ART

In the field of golf balls, much art for controlling the flight performance, the feel at impact and the spin rate of a golf ball on approach shots by providing the ball with a multilayer structure has hitherto been described. Such art includes disclosures which, aside from making the cover encasing the core multilayered give the core itself a layered structure of two or more layers and, by diversifying the hardness profile at the internal cross-section of the core or via synergistic effects owing to mutually differing materials in the inner and outer core layers, achieve a high durability while maintaining a high core rebound.

Art relating to multilayer cores includes the golf balls described in the patent publications JP-A S63-105774 (corresponding to U.S. Pat. No. 4,848,770), JP-A H02-228978 (corresponding to U.S. Pat. No. 5,002,281) and JP-A H06-218077 (corresponding to U.S. Pat. No. 5,482,285) that disclose manufacturing methods in which an inner core layer (center core) is peripherally encased by an outer core layer.

Achieving uniform core layers is indispensable for producing golf balls of high quality and performance. A number of disclosures to this end have been made, examples of such known art being the golf balls described in U.S. Pat. Nos. 6,172,161, 6,494,791, 6,679,789, 6,180,040 and 6,207,095. Of these, U.S. Pat. Nos. 6,172,161, 6,494,791 and 6,679,789 describe art in which a crystalline polymer such as trans-polyisoprene or trans-polybutadiene is added to an outer core layer-forming rubber composition, which is then molded into a cup-like shape. U.S. Pat. Nos. 6,180,040 and 6,207,095 describe art in which an outer core layer-forming rubber composition is molded into cups in a semi-vulcanized state.

However, in the above art that adds a crystalline polymer to an outer core layer-forming rubber composition, the core rebound decreases on account of the addition of crystalline polymer. Also, in the prior art which molds a rubber composition into cups in a semi-vulcanized state, this rubber material does not adhere well to the periphery of the center core. As a result, due to decreased adhesion between these layers, declines occur in ball properties such as the flight performance, the spin rate on approach shots and the feel at impact, as well as the durability. Moreover, a step for providing a bonding layer between these layers must be separately provided, which increases the production costs.

SUMMARY OF THE INVENTION

It is therefore an object of the present invention to provide a golf ball in which an inexpensive multilayer core can be achieved, which ball is endowed with a high rebound performance, a high interlaminar adhesion and an excellent durability. Another object is to provide a method for manufacturing such golf balls.

As a result of extensive investigations, I have discovered that, in a golf ball having a multilayer core that includes a center core and an envelope layer encasing the center core, by using, as the rubber material for the envelope layer, a rubber composition which includes:

(a) a diene rubber,
(b) a tetrazine compound of the following general formula or a metal salt thereof

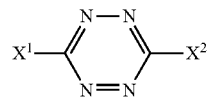

(wherein $X^1$ and $X^2$ are mutually like or unlike heterocyclic groups, at least one of which is a pyridyl group or a pyridazinyl group),
(c) an $\alpha,\beta$-unsaturated carboxylic acid metal salt, and
(d) an organic peroxide, pre-molding this rubber composition into cup-like shapes, and placing these unvulcanized molded cups around the center core and molding under applied heat so as to produce a multilayer core, golf balls having this multilayer core are endowed with a high rebound and durability. Moreover, I have also found that this multilayer core fabricating operation, because it does not require that equipment be furnished for a bonding step or the like in order to enhance interlaminar adhesion, results in low production costs and is industrially advantageous.

In other words, I have discovered that, with the use of a rubber composition containing above components (a) to (d), when the temperature of the rubber composition is lowered to room temperature after kneading, the viscosity of the unvulcanized rubber rises greatly, and when the temperature is raised, the viscosity falls, thus enabling an unvulcanized rubber composition that can be easily processed to a given shape to be obtained. Moreover, I have also found that, in the production of a multilayer core for a golf ball, in cases where an outer core layer that encases the inner core layer is produced, when this rubber composition is used, it is possible to mold an outer layer cup that maintains a uniform shape even without semi-vulcanization or the use of a crystalline polymer. Hence, there is no decrease in the core rebound itself owing to the addition of a crystalline ingredient, nor is there any loss in the ball properties or durability due to a decrease in interlaminar adhesion on account of semi-vulcanization. Moreover, a bonding layer does not need to be provided, and so production costs do not rise.

Accordingly, in a first aspect, the invention provides a golf ball having a center core, one or more envelope layer encasing the center core and one or more cover layer, wherein at least one envelope layer is formed of a rubber composition that includes (a) a diene rubber, (b) a tetrazine compound of the following general formula or a metal salt thereof

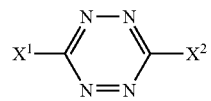

(wherein $X^1$ and $X^2$ are mutually like or unlike heterocyclic groups, at least one of which is a pyridyl group or a pyridazinyl group), (c) an α,β-unsaturated carboxylic acid metal salt and (d) an organic peroxide.

In a preferred embodiment of the golf ball according to the first aspect of the invention, the heterocyclic group in the component (b) formula is a 2-pyridyl group. In this preferred embodiment, component (b) may be 3,6-bis(2-pyridyl)-1,2,4,5-tetrazine.

In another preferred embodiment of the golf ball of the invention, the unsaturated carboxylic acid metal salt of component (c) is a zinc salt.

In yet another preferred embodiment, the rubber composition further includes an organosulfur compound.

In still another preferred embodiment, the rubber composition prior to vulcanization has a Mooney viscosity at 30° C. and a Mooney viscosity at 80° C. with a difference therebetween of at least 40 points.

In a second aspect, the invention provides a method for manufacturing golf balls that includes fabricating a core member having a center core encased by an envelope layer, which method includes the steps of:

pre-molding, as a material for forming the envelope layer, a rubber composition that includes (a) a diene rubber, (b) a tetrazine compound of the following general formula or a metal salt thereof

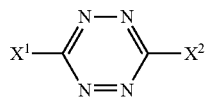

(wherein $X^1$ and $X^2$ are mutually like or unlike heterocyclic groups, at least one of which is a pyridyl group or a pyridazinyl group), (c) an α,β-unsaturated carboxylic acid metal salt and (d) an organic peroxide into a cup-like shape at a temperature at or below the 10-hour half-life temperature of component (d) so as to give an unvulcanized cup-shaped molded material; and encasing the center core with the unvulcanized cup-shaped molded material and molding under applied heat.

In a preferred embodiment of the manufacturing method according to the second aspect of the invention, the rubber composition prior to vulcanization has a Mooney viscosity at 30° C. and a Mooney viscosity at 80° C. with a difference therebetween of at least 40 points.

In another preferred embodiment of the manufacturing method of the invention, component (b) in the rubber composition is reacted with component (a), forming a polymer that is included thereafter within the rubber composition.

Advantageous Effects of the Invention

In the golf ball and method of manufacture thereof according to the invention, an envelope layer which envelopes the center core is formed using an unvulcanized rubber composition that can easily be processed into a given shape. The golf ball having this multilayer core possesses a high rebound and durability. Moreover, this method for manufacturing a multilayer core eliminates the need to furnish equipment for a bonding step, which results in low production costs and is industrially advantageous.

BRIEF DESCRIPTION OF THE DIAGRAMS

FIG. 1 is a schematic diagram illustrating measurement of the eccentricity of a center core encased by an envelope layer.

DESCRIPTION OF THE PREFERRED EMBODIMENTS

The objects, features and advantages of the invention will become more apparent from the following detailed description taken in conjunction with the appended diagram.

The golf ball of the invention has a multilayer core that includes a center core and an envelope layer encasing the center core.

The center core and the envelope layer can be formed using rubber materials.

Here, the center core and the envelope layer are collectively referred to as the "constituent members of the core."

The constituent members of the core (i.e., the center core and the envelope layer) are each formed of like or unlike rubber compositions, which compositions include a base rubber such as polybutadiene rubber, a co-crosslinking agent, an organic peroxide and, where necessary, other ingredients such as fillers.

The base rubber of the rubber composition is a diene rubber, use preferably being made of a polybutadiene. The polybutadiene is preferably one having a cis-1,4-bond content on the polymer chain of at least 80 wt %, more preferably at least 90 wt %, and even more preferably at least 95 wt %. At a cis-1,4-bond content among the bonds on the molecule which is too low, the resilience may decrease. The polybutadiene has a content of 1,2-vinyl bonds on the polymer chain which is preferably not more than 2 wt %, more preferably not more than 1.7 wt %, and even more preferably not more than 1.5 wt %. At a 1,2-vinyl bond content which is too high, the resilience may decrease.

To obtain a cured molding of the rubber composition having a good resilience, the polybutadiene included is preferably one synthesized with a rare-earth catalyst or a group VIII metal compound catalyst. A polybutadiene synthesized with a rare-earth catalyst is especially preferred.

Rubber ingredients other than the above polybutadiene may be included in the rubber composition, provided that doing so does not detract from the advantageous effects of the invention. Illustrative examples of rubber ingredients other than the above polybutadiene include other polybutadienes and also other diene rubbers, such as styrene-butadiene rubber, natural rubber, isoprene rubber and ethylene-propylene-diene rubber.

The co-crosslinking agent is exemplified by metal salts of α,β-unsaturated carboxylic acids. Specific examples of α,β-unsaturated carboxylic acids include acrylic acid, methacrylic acid, maleic acid and fumaric acid. The use of acrylic acid or methacrylic acid is especially preferred. Metal salts of unsaturated carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred. Feeding of the unsaturated carboxylic acid metal salt to the rubber composition may be carried out by directly mixing the metal salt into the rubber composition. Alternatively, the metal salt may be fed to the rubber composition by reacting the unsaturated carboxylic acid with a cation source such as a metal oxide within the rubber composition. However, the method used to feed the metal salt is not limited to these alone.

The unsaturated carboxylic acid metal salt is included in an amount, per 100 parts by weight of the base rubber, which is preferably at least 5 parts by weight, more preferably at least 10 parts by weight, and even more preferably at least 15 parts by weight. The amount included is preferably not more than 60 parts by weight, more preferably not more than 50 parts by weight, and even more preferably not more than 45 parts by weight. Too much may make the core too hard, giving the ball an unpleasant feel at impact, whereas too little may lower the rebound.

Examples of the organic peroxide include dialkyl peroxides such as dicumyl peroxide, di(2-t-butylperoxyisopropyl) benzene, t-butylcumyl peroxide, di-t-butyl peroxide, 2,5-dimethyl-2,5-di(t-butylperoxy)hexane, di-t-hexyl peroxide and 2,5-dimethyl-2,5-di(t-butylperoxy)hexane-3; peroxyketals such as 1,1-bis(t-butylperoxy)-3,3,5-trimethylcyclohexane, 1,1-di(t-hexylperoxy)-3,3,5-trimethylcyclohexane, 1,1-di(t-hexylperoxy)cyclohexane, 2,2-di(4,4-di-(t-butylperoxy)cyclohexyl)propane, n-butyl-4,4-di(t-butylperoxy)valerate and 1,1-di(t-butylperoxy)cyclohexane; diacyl peroxides such as diisobutyryl peroxide, di(3,3,5-trimethylhexanoyl) peroxide, dilauroyl peroxide and disuccinic acid peroxide; peroxy esters such as 1,1,3,3-tetramethylbutylperoxy-2-ethylhexanoate, t-hexylperoxy-2-ethylhexanoate, t-butylperoxy-2-ethylhexanoate, t-butylperoxylaurate and t-butylperoxyacetate; ketone peroxides such as cyclohexanone peroxide and acetylacetone peroxide; hydroperoxides such as p-menthane hydroperoxide and diisopropylbenzene hydroperoxide, and peroxydicarbonates such as diisopropyl peroxydicarbonate and di(4-t-butylcyclohexyl) peroxydicarbonate. These organic peroxides may be used singly or two or more may be used in combination.

The organic peroxide may be a commercially available product, specific examples of which include those having the trade names Percumyl D, Perhexa C-40, Perbutyl P, Perbutyl C, Perbutyl D, Perhexa 25B, Perhexyl D, Perhexyne 25B, Perhexa TMH, Perhexa HC, Pertetra A, Perhexa V, Peroyl IB, Peroyl 335, Peroyl L, Peroyl SA, Perbutyl L, Perbutyl A, Perocta O, Perhexyl O, Perbutyl O, Perhexa H, Percure AH, Permentha H, Percumyl P, Peroyl IPP and Peroyl TCP (all available from NOF Corporation), and that having the trade name Trigonox 29-40B (40% concentration product, from Akzo Nobel N.V.).

The amount of organic peroxide included per 100 parts by weight of the base rubber is preferably at least 0.1 part by weight, more preferably at least 0.3 part by weight, even more preferably at least 0.5 part by weight, and most preferably at least 0.7 part by weight. The upper limit is preferably not more than 5 parts by weight, more preferably not more than 4 parts by weight, even more preferably not more than 3 parts by weight, and most preferably not more than 2 parts by weight. When too much or too little is included, it may not be possible to obtain a ball having a good feel, durability and rebound.

An inert filler may be included as another ingredient. Examples of preferred inert fillers include zinc oxide, barium sulfate and calcium carbonate. These may be used singly or two or more may be used together. The amount of inert filler included per 100 parts by weight of the base rubber is preferably at least 1 part by weight, and more preferably at least 5 parts by weight. The upper limit in the amount included is preferably not more than parts by weight, more preferably not more than 80 parts by weight, and even more preferably not more than 60 parts by weight. Too much or too little inert filler may make it impossible to obtain a suitable weight and a good rebound.

In addition, an antioxidant may be optionally included. Illustrative examples of suitable commercial antioxidants include Nocrac NS-6, Nocrac NS-30 and Nocrac 200 (all available from Ouchi Shinko Chemical Industry Co., Ltd.), and Yoshinox 425 (Yoshitomi Pharmaceutical Industries, Ltd.). These may be used singly or as a combination of two or more thereof. The amount of antioxidant included can be set to more than 0, and may be set to an amount per 100 parts by weight of the base rubber which is preferably at least 0.05 part by weight, and more preferably at least 0.1 part by weight. The maximum amount included per 100 parts by weight of the base rubber, although not particularly limited, may be set to preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable core hardness gradient, a good rebound and durability, and a good spin rate-lowering effect on full shots.

An organosulfur compound may be optionally included in the rubber composition in order to increase the resilience of the constituent members of the core. In cases where an organosulfur compound is included, the amount thereof per 100 parts by weight of the base rubber may be set to preferably at least 0.05 part by weight, and more preferably at least 0.1 part by weight. The upper limit in the amount of the organosulfur compound may be set to preferably not more than 5 parts by weight, more preferably not more than 4 parts by weight, and even more preferably not more than 2 parts by weight. Including too little organosulfur compound may make it impossible to obtain a sufficient resilience-increasing effect on the constituent members of the core. On the other hand, when too much is included, the hardness of the constituent members of the core may become too low, worsening the feel of the ball at impact, and the durability of the ball to cracking on repeated impact may worsen.

Exemplary organosulfur compounds include, without particular limitation, thiophenols, thionaphtbols, diphenylpolysulfides, halogenated thiophenols, and metal salts of these. Specific examples include the zinc salts of pentachlorothiophenol, pentafluorothiophenol, pentabromothiophenol and p-chlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. These may be used singly or two or more may be used in combination. Of these, preferred use can be made of the zinc salts of pentachlorothiophenol and/or diphenyldisulfides.

In the practice of the invention, the rubber composition described above is vulcanized and molded to create the center core. In general, production of the center core may be carried out in the usual manner by molding the rubber composition into a spherical molded product using heat and compression under vulcanization conditions of at least 140° C. and not more than 180° C. for at least 10 minutes and not more than 60 minutes.

Apart from the above-described rubber composition, it is also possible to use foam or a resin or metal as the center core material. In cases where a material such as rubber, foam, resin or the like is used, various fillers, crosslinking agents and the like may be optionally added.

In this invention, at least one envelope layer is formed of a rubber composition which includes:
(a) a diene rubber,
(b) a tetrazine compound of the following general formula or a metal salt thereof

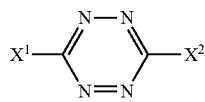

(wherein $X^1$ and $X^2$ are mutually like or unlike heterocyclic groups, at least one of which is a pyridyl group or a pyridazinyl group),
(c) an α,β-unsaturated carboxylic acid metal salt, and
(d) an organic peroxide.

(a) Diene Rubber

Details on component (a) are the same as those for the base rubber used in the above-described constituent members of the core (i.e., the center core and the envelope layer).

(b) Tetrazine Compound or Metal Salt Thereof

The tetrazine compound is a compound of the following general formula.

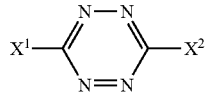

In the formula, $X^1$ and $X^2$ are mutually like or unlike heterocyclic groups, at least one of the heterocyclic groups represented by $X^1$ and $X^2$ being a pyridyl group or a pyridazinyl group. Examples include 2-pyridyl, 3-pyridyl, 4-pyridyl, 3-pyridazinyl and 4-pyridazinyl groups. A 2-pyridyl group is especially preferred.

The tetrazine compound serving as component (b) is preferably 3,6-bis(2-pyridyl)-1,2,4,5-tetrazine.

(c) α,β-Unsaturated Carboxylic Acid Metal Salt

Details on component (c) are the same as those for the α,β-unsaturated carboxylic acid metal salt serving as the co-crosslinking agent used in the above-described constituent members of the core.

(d) Organic Peroxide

Details on component (d) are the same as those for the organic peroxide used in the above constituent members of the core.

An organosulfur compound may be additionally included in the rubber composition containing above components (a) to (d). Details on this organosulfur compound are the same as those for the organosulfur compound used in the above-described constituent members of the core.

The rubber composition containing above components (a) to (d) can be mixed using a conventional rubber mixer such as a Banbury mixer, a kneader or a roll mill. The mixing method is exemplified by methods (i) to (iv) below:
(i) the method of introducing components (a), (b), (c) and (d) at the same time into the rubber mixer;
(ii) the method of introducing components (a), (b) and (c) into the mixer and working them together, subsequently lowering the rubber mixing temperature, and then introducing and working in component (d);
(iii) the method of introducing components (a) and (b) into the mixer and working them together, and then introducing (c) and (d), either all at once or in divided portions, and working them in; and
(iv) the method of first reacting components (a) and (b) together to form a modified rubber, and then introducing this together with components (c) and (d), either all at once or in divided portions, into the mixer and working them together.

Of above methods (i) to (iv), method (iii) or method (iv) is preferably used, with method (iv) being especially preferred. That is, in the rubber composition containing components (a) to (d), it is preferable to react component (b) with component (a), and to then include the polymer obtained by this reaction in the rubber composition.

When the temperature of the rubber composition containing components (a) to (d) is lowered to room temperature after mixing of the composition, the viscosity of the unvulcanized rubber greatly rises; when the temperature is raised, the viscosity drops. In order to adjust the unvulcanized rubber composition so as to enable it to be easily processed to a desired shape, it is preferable for the unvulcanized rubber composition to have a Mooney viscosity at 30° C. and a Mooney viscosity at 80° C. with a difference therebetween of at least 40 points, and more preferably at least 50 points. Measurement of these Mooney viscosities can be carried out in general accordance with JIS K 6300-1:2013.

The method of forming the envelope layer over the center core is described. In the practice of the invention, the rubber composition containing components (a) to (d) is used as the envelope layer material, this being pre-molded into a cup-like shape. The pre-molding operation entails charging the rubber composition, which has been adjusted to the necessary weight, into a mold having concave and convex parts capable of shaping the composition into a cup-like shape, and then closing the mold and shaping the charge at a temperature and time such that crosslinking reactions do not begin. This shaping operation is preferably carried out at a temperature at or below the 10-hour half-life temperature of component (d). The shape of the pre-molded material can be suitably adjusted according to the shape of the core to be encased and according to the mold shape, which depends on the construction of the multilayer core to be ultimately obtained. The pre-molded material thus obtained is removed from the mold and then placed in a lower temperature environment than the shaping temperature, thereby enabling the shape immediately after pre-molding to be retained.

Next, when the unvulcanized cup-shaped molding obtained by the pre-molding operation is placed around the center core and molded under applied heat, the center core that has already been shaped is encased from above and below by the pre-molded cups and the resulting assembly is charged into a multilayer core-forming mold capable of yielding the desired shape, where molding under applied heat is carried out at a temperature and time required for the crosslinking reactions to take place in the pre-molded material, thereby obtaining the desired multilayer core.

The thickness of the envelope layer, although not particularly limited, is preferably at least 2 mm, more preferably at least 5 mm, and even more preferably at least 8 mm. The upper limit is preferably not more than 15 mm, and more preferably not more than 10 mm. When this thickness is too large or too small, the performance as a multilayer core is not fully exhibited, and the flight performance, feel, durability and the like of the golf ball cannot be improved.

Next, the cover used in the inventive golf ball is described. The cover is a member that encases the core and is composed of at least one layer. Exemplary covers include two-layer covers and three-layer covers. In the case of a two-layer cover, the inner layer is referred to as the intermediate layer and the outer layer is referred to as the outermost layer. In the case of a three-layer cover, the respective layers are referred to, in order from the inside: the envelope layer, the intermediate layer and the outermost layer.

Known resins may be used without particular limitation as the resin material that forms the cover. Use can be made of one or more resin selected from the group consisting of ionomer resins and, for example, urethane-, amide-, ester-, olefin- and styrene-based thermoplastic elastomers. Alternatively, a resin material such as polyurethane or polyurea may be used to form the cover.

The ionomer resin is not subject to any particular limitation, and may be a known product. Commercial products that may be used as the ionomer resin include, for example, H1706, H1605, H1557, H1601, AM7329, AM7317 and AM7318, all of which are available from DuPont-Mitsui Polychemicals Co.

Thermoplastic elastomers are exemplified by polyester elastomers, polyamide elastomers and polyurethane elastomers. The use of a polyurethane elastomer is especially preferred.

The polyurethane elastomer is not particularly limited, provided it is an elastomer composed primarily of polyurethane. A morphology that includes soft segments composed of a high-molecular-weight polyol compound and hard segments composed of a diisocyanate and a monomolecular chain extender is preferred.

Exemplary polymeric polyol compounds include, but are not particularly limited to, polyester polyols and polyether polyols. From the standpoint of rebound resilience or low-temperature properties, the use of a polyether polyol is preferred. Examples of polyether polyols include polytetramethylene glycol and polypropylene glycol, with the use of polytetramethylene glycol being especially preferred. These compounds have a number-average molecular weight of preferably from 1,000 to 5,000, and more preferably from 1,500 to 3,000.

Exemplary diisocyanates include, but are not particularly limited to, aromatic diisocyanates such as 4,4'-diphenylmethane diisocyanate, 2,4-toluene diisocyanate and 2,6-toluene diisocyanate; and aliphatic diisocyanates such as hexamethylene diisocyanate. In the practice of this invention, from the standpoint of reaction stability with the subsequently described isocyanate mixture when blended therewith, the use of 4,4'-diphenylmethane diisocyanate is preferred.

The monomolecular chain extender is not particularly limited, although use can be made of an ordinary polyol or polyamine. Specific examples include 1,4-butylene glycol, 1,2-ethylene glycol, 1,3-propylene glycol, 1,3-butanediol, 1,6-hexylene glycol, 2,2-dimethyl-1,3-propanediol, 1,3-butylene glycol, dicyclohexylmethylmethanediamine (hydrogenated MDA) and isophoronediamine (IPDA). These chain extenders have average molecular weights of preferably from 20 to 15,000.

A commercial product may be used as the polyurethane elastomer. Illustrative examples include Pandex T7298, TR3080, T8230, T8290, T8295 and T8260 (all available from DIC Covestro Polymer, Ltd.), and Resamine 2593 and 2597 (available from Dainichiseika Color & Chemicals Mfg. Co., Ltd.). These may be used singly, or two or more may be used in combination.

The material which forms the cover is exemplified by a resin composition containing as the essential ingredients: 100 parts by weight of a resin component composed of, in admixture.

(A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (B) a non-ionomeric thermoplastic elastomer in a weight ratio between 100:0 and 50:50;

(C) from 5 to 120 parts by weight of a fatty acid and/or fatty acid derivative having a molecular weight of from 228 to 1,500; and (D) from 0.1 to 17 parts by weight of a basic inorganic metal compound capable of neutralizing un-neutralized acid groups in components (A) and (C).

Components (A) to (D) in the resin material described in, for example, JP-A 2011-120898 may be advantageously used as above components (A) to (D).

Various additives may be optionally included in the cover-forming material. For example, pigments, dispersants, antioxidants, light stabilizers, ultraviolet absorbers and internal mold lubricants may be suitably included.

A known method may be used without particular limitation as the method of forming the layers of the cover. For example, use may be made of a method in which a pre-fabricated core or a sphere encased by various layers is placed in a mold, and the resin material prepared as described above is injection-molded over the core or layer-encased sphere.

Numerous dimples of one, two or more types may be formed on the surface of the cover in order to improve the aerodynamic performance of the ball. The dimple shapes used may be of one type or a combination of two or more types selected from among circular shapes, various polygonal shapes, dewdrop shapes and oval shapes.

Various types of coatings may be applied to the surface of the cover. Because the coating must be capable of enduring the harsh conditions of golf ball use, a two-part curable urethane coating, especially a non-yellowing urethane coating, is preferred.

The golf ball of the invention can be made to conform to the Rules of Golf for competitive play. Specifically, the inventive ball may be formed to a diameter which is such that the ball does not pass through a ring having an inner diameter of 42.672 mm and is not more than 42.80 mm, and to a weight which is preferably from 45.0 to 45.93 g.

EXAMPLES

The following Examples and Comparative Examples are provided to illustrate the invention, and are not intended to limit the scope thereof.

Examples 1 and 2, Comparative Examples 1 to 3

A 20 mm diameter center core was produced by using the rubber composition common to all the Examples shown in Table 1 below and vulcanizing for 20 minutes at 155° C.

TABLE 1

| Rubber composition for center core (parts by weight) | I |
|---|---|
| cis-1,4-Polybutadiene | 100 |
| Zinc acrylate | 20 |

TABLE 1-continued

| Rubber composition for center core (parts by weight) | I |
|---|---|
| Zinc oxide | 23.7 |
| Antioxidant | 0.1 |
| Dicumyl peroxide | 1 |

Details on the above core materials are given below.

cis-1,4-Polybutadiene: Available under the trade name "BR 01" from JSR Corporation Zinc acrylate: Available under the product name "ZNDA-85S" (zinc acrylate, 85%, zinc stearate, 15%) from Nippon Shokubai Co., Ltd.

Zinc oxide: Available under the trade name "Zinc Oxide Grade 3" from Sakai Chemical Co., Ltd.

Antioxidant: Available under the trade name "Nocrac NS-6" from Ouchi Shinko Chemical Industry Co., Ltd.

Dicumyl peroxide: Available under the trade name "Percumyl D" from NOF Corporation; 10-hour half-life temperature, 116.4° C.; one-hour half-life temperature, 175.1° C.

Next, the center core was peripherally encased by an envelope layer. First, one of envelope layer-forming rubber compositions A to E shown in Table 2 below was furnished, this rubber composition was kneaded by the kneading method described below, and the kneaded rubber was shaped into half-cups. The shaping conditions were the shaping temperature and time for the respective Examples shown in Table 2. That is, using a mold having concave and convex portions capable of forming the charge into a cup-like shape having an inside diameter of 20 mm and an outside diameter of 38.5 mm, shaping was carried out at the elevated temperatures for the respective Examples shown in Table 2. After such shaping, the charge was left to stand for 3 hours at room temperature, thereby completing the shaping operation. Next, the unvulcanized cup-shaped moldings obtained by such pre-molding were placed over the center core so as to encase the center core, and molded under applied heat. This molding operation was carried out for 20 minutes at 155° C., thereby producing a two-layer core in which the center core is encased by an envelope layer.

Method for Preparing (Kneading) Rubber Composition

In each rubber composition, the base rubber serving as component (a) and the tetrazine serving as component (b) were charged into a mixer and kneaded. After the rubber temperature reached 130° C., the ingredients other than the organic peroxide serving as component (d) were introduced and mixed together, after which the mixture was briefly discharged from the mixer. The rubber temperature was then lowered, after which the organic peroxide was introduced. After the rubber temperature reached 90° C., the mixture was discharged, yielding the prepared rubber composition. In cases where the tetrazine of component (b) was not included, aside from introducing the base rubber serving as component (a) alone and kneading until the rubber temperature reached 130° C., the rubber composition was prepared as described above; that is, in the same way as for the formulations containing component (b).

TABLE 2

| Rubber composition for envelope layer (pbw) | | A | B | C | D | E |
|---|---|---|---|---|---|---|
| 1,4-Polybutadiene (BR01) | | 100 | 100 | 100 | 100 | 70 |
| 1,2-Polybutadiene (RB810) | | | | | | 30 |
| 3,6-bis(2-pyridyl)-1,2,4,5-tetrazine | | 0.2 | 2 | | | |
| Zinc acrylate | | 25 | 25 | 25 | 25 | 25 |
| Zinc oxide | | 21.5 | 21.5 | 21.5 | 21.5 | 21.5 |
| Antioxidant | | 0.1 | 0.1 | 0.1 | 0.1 | 0.1 |
| Dicumyl peroxide | | 1 | 1 | 1 | 1 | 1 |
| Mooney viscosity | 80° C. | 37.7 | 43.8 | 31.4 | 31.4 | 29.4 |
| measurements | 30° C. | 96.1 | 137.2 | 69.8 | 69.8 | 91.3 |
| ($ML_{1+4}$) | Viscosity difference | 58.4 | 93.4 | 38.4 | 38.4 | 61.9 |
| Pre-molding temperature (° C.) | | 80 | 80 | 145 | 80 | 80 |
| Pre-molding time (min) | | 1 | 1 | 20 | 1 | 1 |
| Standing environment after pre-molding | | room temperature | room temperature | room temperature | room temperature | room temperature |
| Standing time after pre-molding (h) | | 3 | 3 | 3 | 3 | 3 |

The ingredients in the above rubber materials are explained below. For ingredients that are the same as those used in the center core material, details are identical to those given above in Table 1.

1,2-Polybutadiene: A syndiotactic 1,2-polybutadiene available under the trade name "RB810" (melting point, 71° C.) from JSR Corporation.

3,6-bis(2-pyridyl)-1,2,4,5-tetrazine: Available from Tokyo Chemical Industry Co., Ltd.

Measurement of Mooney Viscosity

Moody viscosity tests were carried out on the rubber compositions (unvulcanized rubber) in the Examples at test temperatures of 80° C. and 30° C. in general accordance with JIS K 6300-1: 2013.

Measurement of Maximum Eccentricity of Outer Layer-Encased Core

For a two-layer core obtained by encasing the center core with an envelope layer and then vulcanizing, the core was cut in a flat plane such that the cross-section passes through the center of the core, and the cross-sectional face was examined. Referring to FIG. 1, letting $L_1$ represent the longest portion and $L_2$ represent the shortest portion of the distance from the surface of the two-layer core 10 to the surface of the center core 1, the difference in length $L_1$-$L_2$ was treated as the maximum eccentricity of the core. The maximum eccentricity was measured in this way for ten cores each in Examples 1 and 2 and Comparative Examples 1, 2 and 3. The average values obtained for the ten cores in each Example are shown in Table 4.

Shape of Cover Layer (Intermediate Layer and Outermost Layer)

The ionomeric resin shown in Table 3 below as a material common to all the Examples was injection molded over the resulting 38.5 mm diameter core so as to peripherally encase it, thereby producing a sphere encased by an intermediate layer having a thickness of 1.3 mm (intermediate layer-encased sphere). Next, the thermoplastic polyurethane resin shown in Table 3 below as a material common to all the Examples was injection molded over the resulting intermediate layer-encased sphere so as to peripherally encase it, thereby producing a sphere encased by an outermost layer having a thickness of 0.8 mm; that is, the ball itself (a four-piece golf ball having a diameter of 42.7 mm). Dimples common to each Example were formed on the ball surface in the respective Examples and Comparative Examples.

TABLE 3

| Formulation (pbw) | Intermediate layer | Outermost layer |
|---|---|---|
| Himilan 1706 | 35 | |
| Himilan 1557 | 15 | |
| Himilan 1605 | 50 | |
| TPU | | 100 |
| Polyethylene wax | | 1.0 |
| Titanium oxide | | 3.3 |
| Trimethylolpropane | 1.1 | |

Details on the ingredients in the above table are given below.

Himilan 1706, Himilan 1557, Himilan 1605:
  Ionomeric resins available from DuPont-Mitsui Polychemicals Co., Ltd.

TPU: An ether-type thermoplastic polyurethane (Shore D hardness, 40) available under the trade name "Pandex" from DIC Covestro Polymer, Ltd.

Polyethylene wax: Available under the trade name "Sanwax 161P" from Sanyo Chemical Industries, Ltd.

The compressive hardness, initial velocity and durability to repeated impact for the golf balls obtained in the respective Examples and Comparative Examples were determined by the methods described below. The results are presented in Table 4.

Compressive Hardness

The compressive hardness (deformation) (mm) of the ball at a temperature of 23±1° C. when compressed at a rate of 10 mm/s under an initial load of 98 N (10 kgf) to a final load of 1,275 N (130 kgf) was measured, and the average value for ten measured balls was determined.

Initial Velocity

The initial velocity was measured using an initial velocity measuring apparatus of the same type as the USGA drum rotation-type initial velocity instrument approved by the R&A. The balls were tested in a chamber at a room temperature of 23.9±2° C. after being held isothermally in a 23.9±1° C. environment for at least 3 hours. Each ball was hit using a 250-pound (113.4 kg) head (striking mass) at an impact velocity of 143.8 ft/s (43.83 m/s). One dozen balls were each hit four times. The time taken for the ball to traverse a distance of 6.28 ft (1.91 m) was measured and used to compute the initial velocity (m/s). This cycle was carried out over a period of about 15 minutes. Initial velocity indices for the balls in the respective Examples were calculated relative to a reference value of 1.000 for the ball initial velocity in Example 1, and are shown in Table 4.

Durability

The durability of the golf ball was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set to 43 m/s. The number of shots required for the golf ball to crack was measured, and the average value of the measurements taken for ten golf balls was calculated. Durability indices for the balls in the respective Examples were calculated relative to a reference value of 1.00 for the average number of shots required for the ball obtained in Example 1 to crack, and are shown in Table 4.

TABLE 4

| | | Example | | Comparative Example | | |
|---|---|---|---|---|---|---|
| | | 1 | 2 | 1 | 2 | 3 |
| Center core | Diameter (mm) | 20 | 20 | 20 | 20 | 20 |
| Envelope layer-encased sphere (2-layer core) | Envelope layer (cup) type | A | B | C | D | E |
| | Molding temperature (° C.) | 155 | 155 | 155 | 155 | 155 |
| | Molding time (min) | 20 | 20 | 20 | 20 | 20 |
| | Diameter (mm) | 38.5 | 38.5 | 38.5 | 38.5 | 38.5 |
| Intermediate layer | Thickness | 1.3 mm | | | | |
| | Hardness (Shore D) | 64 | | | | |
| | Resin material | ionomeric resin | | | | |
| Outermost layer | Thickness | 0.8 mm | | | | |
| | Hardness (Shore D) | 41 | | | | |
| | Resin material | ether-type thermoplastic polyurethane resin | | | | |
| Envelope layer-encased sphere | Maximum eccentricity (mm) | 0.3 | 0.3 | 0.5 | 3.2 | 0.4 |
| Ball | Compression hardness (mm) | 2.71 | 2.72 | 2.83 | 2.74 | 2.58 |
| | Initial velocity (index) | 1.000 | 1.000 | 0.992 | 0.996 | 0.987 |
| | Durability (index) | 1.00 | 1.01 | 0.69 | 0.91 | 0.99 |

It is apparent from the results in Table 4 that, in Examples 1 and 2, no deformation occurred after pre-molding of the outer layer cups, and so eccentricity did not arise and the bond strength with the center core did not decrease. Hence, it was possible to achieve a high durability in the golf balls that were produced. Also, in Examples 1 and 2, no crystalline polymer was added, and so a decrease in ball rebound did not occur.

By contrast, in Comparative Example 1, the bond strength between the center core and the encasing layer weakened, as a result of which cracking soon arose.

In Comparative Example 2, compressive deformation after pre-molding of the outer layer cup was larger, and so a large eccentricity like that shown in FIG. 1 arose.

In Comparative Example 3, crystalline polymer was added, as a result of which a decrease in the ball rebound occurred.

Japanese Patent Application No. 2018-245161 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a center core, one or more envelope layer encasing the center core and one or more cover layer, wherein at least one envelope layer is formed of a rubber composition comprising:
   (a) a diene rubber;
   (b) a tetrazine compound of the following general formula or a metal salt thereof

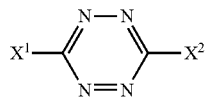

(wherein $X^1$ and $X^2$ are mutually like or unlike heterocyclic groups, at least one of which is a pyridyl group or a pyridazinyl group);
   (c) an α, β-unsaturated carboxylic acid metal salt; and
   (d) an organic peroxide, and
   wherein the center core is formed of a rubber composition which does not include component (b).

2. The golf ball of claim 1, wherein the heterocyclic group in the component (b) formula is a 2-pyridyl group.

3. The golf ball of claim 2, wherein component (b) is 3,6-bis(2-pyridyl)-1,2,4,5-tetrazine.

4. The golf ball of claim 1, wherein the unsaturated carboxylic acid metal salt of component (c) is a zinc salt.

5. The golf ball of claim 1, wherein the rubber composition further comprises an organosulfur compound.

6. The golf ball of claim 1, wherein the rubber composition prior to vulcanization has a Mooney viscosity at 30° C. and a Mooney viscosity at 80° C. with a difference therebetween of from 40 to 93.4 points.

7. A method for manufacturing golf balls that includes fabricating a core member having a center core encased by an envelope layer, which method comprises the steps of:
   pre-molding, as a material for forming the envelope layer, a rubber composition that includes (a) a diene rubber, (b) a tetrazine compound of the following general formula or a metal salt thereof

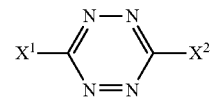

(wherein $X^1$ and $X^2$ are mutually like or unlike heterocyclic groups, at least one of which is a pyridyl group or a pyridazinyl group), (c) an α, β-unsaturated carboxylic acid metal salt and (d) an organic peroxide into a cup-like shape at a temperature at or below the 10-hour half-life temperature of component (d) so as to give an unvulcanized cup-shaped molded material; and
   encasing the center core with the unvulcanized cup-shaped molded material and molding under applied heat, and
   wherein the center core is formed of a rubber composition which does not include component (b).

8. The manufacturing method of claim 7 wherein the rubber composition prior to vulcanization has a Mooney viscosity at 30° C. and a Mooney viscosity at 80° C. with a difference therebetween of from 40 to 93.4 points.

9. The manufacturing method of claim 7, wherein component (b) in the rubber composition is reacted with component (a), forming a polymer that is included thereafter within the rubber composition.

10. The golf ball of claim 1, wherein the amount of component (b) is from 0.2 to 2 per 100 parts by weight of the component (a).

11. The golf ball of claim 1, wherein the thickness of the at least one envelope layer is from 2 to 10 mm.

\* \* \* \* \*